US006429986B1

(12) United States Patent
Blaum et al.

(10) Patent No.: US 6,429,986 B1
(45) Date of Patent: Aug. 6, 2002

(54) DATA STORAGE TO ENHANCE TIMING RECOVERY IN HIGH DENSITY MAGNETIC RECORDING

(75) Inventors: Mario Blaum, San Jose; Constantin Michael Melas, Los Gatos, both of CA (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 08/816,648

(22) Filed: Mar. 13, 1997

Related U.S. Application Data

(62) Division of application No. 08/524,817, filed on Sep. 7, 1995, now abandoned.

(51) Int. Cl.[7] .................................................. G11B 5/09
(52) U.S. Cl. ............................. 360/41; 360/51; 360/32
(58) Field of Search ............................. 360/41, 51, 32; 341/59; 364/602; 371/43.1; 375/290, 294, 340, 341, 359, 360

(56) References Cited

U.S. PATENT DOCUMENTS

| | | | |
|---|---|---|---|
| 3,636,536 A | 1/1972 | Norris | 360/51 |
| 4,355,408 A | 10/1982 | Scarrott | 375/360 |
| 4,379,347 A | 4/1983 | Girardi et al. | 375/340 |
| 4,707,842 A | 11/1987 | Fischer | 375/359 |
| 4,890,299 A | 12/1989 | Dolivo et al. | 375/290 |
| 4,945,538 A | 7/1990 | Patel | 371/43.1 |
| 4,965,873 A | 10/1990 | White | 360/41 |
| 5,173,694 A | 12/1992 | Lynch, Jr. et al. | 341/59 |
| 5,258,933 A | 11/1993 | Johnson et al. | 364/602 |
| 5,260,976 A | 11/1993 | Dolivo et al. | 375/341 |
| 5,267,267 A | 11/1993 | Kazawa et al. | 375/294 |
| 5,463,664 A | 10/1995 | Nakaya | 375/360 |
| 5,521,945 A | * 5/1996 | Knudson | 360/65 X |

OTHER PUBLICATIONS

Schneider, *IBM TDB*, vol. 30, No. 9, Feb. 1988, "Partial Response Detection of (1,k) Codes".
Schneider, *IBM TDB*, vol. 30, No. 9, Feb. 1988, "Extraction of Clock Error from Data Samples".

* cited by examiner

*Primary Examiner*—David Hudspeth
*Assistant Examiner*—Varsha A. Kapadia
(74) *Attorney, Agent, or Firm*—Altera Law Group, LLC

(57) ABSTRACT

A timing recovery system encodes data while impressing recognizable patterns thereon, enabling precise timing during subsequent readback operations. An uncoded binary sequence is encoded using an m/n rate block coded sequence, incorporating a unique predetermined binary bit pattern that occurs with a selected level of frequency. The encoded sequence is stored on the recording medium as a series of flux transitions. To read back the stored data, a read head measures the flux transitions stored on the medium and generates a representative analog waveform. A sampler samples the waveform in accordance with a timing scheme provided by a timing circuit. The timing circuit adjusts the timing of the samples to ensure that the analog waveform is sampled at appropriate times to yield the most accurate results. The timing circuit evaluates two consecutive samples to identify samples associated with features of the analog readback waveform that corresponds to the predetermined bit patterns. Identified samples are then compared to determine whether timing of samples should be advanced, retarded, or retained with respect to the analog waveform. After a detector translates samples into an enclosed binary bit stream, a decoder decodes the detector's binary bit stream by revising the original encoding process, recreating the original encoded binary sequence.

8 Claims, 10 Drawing Sheets

DATA STORAGE TO ENHANCE TIMING RECOVERY IN HIGH DENSITY MAGNETIC RECORDING

This application is a division of application Ser. No. 08/524,817, filed Sep. 7, 1995, now abandoned.

BACKGROUND OF THE INVENTION

1. Field of the Invention

The present invention relates to the timing of operations conducted to read digital data that is stored on recording media such as magnetic tape or disk media. More particularly, the invention concerns a system for encoding binary user data and imposing frequent recognizable bit patterns thereon to serve as self-clocking events during subsequent readback. The invention also concerns a system for performing timing recovery on readback of encoded waveforms.

2. Description of the Related Art

To store user data on a magnetic data storage medium, a data drive writes positive and negative "flux transitions" to the medium. Under the "NRZI" protocol (FIG. 1), a binary "one" may be stored by writing either a positive flux transition (e.g., 100 or 101), or a negative flux transition (e.g., 102) to the medium. A binary "zero" is represented by the absence of a flux transition (e.g., 103). Each binary bit (whether a "one" or a "zero") is written to the storage medium according to a fixed cycle clock. If each cycle lasts 25 $\mu$s, for example, then the 225 $\mu$s sequence of FIG. 1 represents the binary sequence "011001000".

To read data from a storage medium, a read head generates a continuous analog output waveform based upon the flux transitions. Then, processing circuitry uses the output waveform to effectively reconstruct the user data that was originally stored on the storage medium as flux transitions.

FIG. 2 illustrates an analog waveform created when the read head senses the flux transitions of FIG. 1. The waveform 202 contains a series of positive-going and negative-going "pulses" corresponding to the positive and negative flux transitions of FIG. 1. For instance, the positive-going pulse 200 corresponds to the positive flux transition 100, and the negative-going pulse 204 corresponds to the negative flux transition 102.

Since the flux transitions are stored at times specified by a periodic clock, timing is crucial when reading flux transitions from a magnetic data storage medium to create an analog readback waveform. To accurately interpret the analog pulses and distinguish neighboring pulses, the readback processing circuitry must be able to precisely predict or determine where each analog pulse occurs.

The "one-seven" code is one known method that seeks to improve timing accuracy by storing full-sized pulses. Generally, this is accomplished by encoding the binary user data prior to storage. Specifically, th one-seven code maps an uncoded binary bit stream to an encoded binary sequence as follows. One or more binary "ones" are guaranteed to occur in every eight bits, but no two binatryones can occur sequentially. Although the one-seven code is beneficial for certain applications, it has a number of drawbacks when considered for other a uses. For example, the one-seven code involves a mapping of two uncoded bits to three encoded bits -- as a result, the encoded sequence requires one third more storage space in comparison to the uncoded sequence. Therefore, this approach may not be completely satisfactory in applications where storage space is limited or expensive.

SUMMARY OF THE INVENTION

The present invention concerns the reading of data stored on recording media such as magnetic or optical disks, and specifically the timing of such operations. The invention provides a system that encodes binary user data into binary sequences possessing specific bit patterns and stores the encoded binary sequence on the recording media in the form of magnetic flux transitions. Subsequently, the stored flux transitions are read to form a continuous analog waveform confining features corresponding to the specific binary patterns, which enables precise adjustment to timing.

In one embodiment, the present invention concerns a method for encoding a binary sequence of user data for storage on a magnetic data storage medium such as a disk or tape. First, the input sequence to be stored is received in the form of a binary sequence. Then, the uncoded binary sequence is encoded to enable the timing of subsequent readback operations. More particularly, the uncoded binary sequence is encoded such that the encoded binary sequence contains a specific binary pattern, occurring with at least a guaranteed minimum level of frequency. This allows precise timing during readback, as discussed below. To facilitate storage efficiency, the binary pattern may be relatively short, such as "010".

After the binary sequence of user data is encoded, the encoded sequence is stored on the recording medium as a sequence of positive or negative flux transitions. A read head generates a continuous analog readback waveform from the recorded flux transitions. During readback a read head senses flux transitions that representing the encoded binary sequence on the recording medium, thus producing analog peak or analog zero-crossing features in the analog readback waveform. The readback waveform is sampled and digitized to yield a sequence of digits. The digitized sequence is then processed to provide a binary bit stream, thereby reconstructing the encoded binary sequence stored on the recording medium. Then, ether reconstructed encoded binary bit stream is decoded by reversing the encoding procedure.

By evaluating the timing of samples, also a timing circuit adjusts the sampling of the analog readback waveform. This ensures that the analog readback waveform is sampled at appropriate times to yield the most accurate results. In one embodiment, the timing circuit compares the absolute values of two consecutive samples. No change in timing is made unless both samples have the same sign and the sum of their absolute values exceeds a first threshold, if it does, the timing circuit calculates the difference between the samples' absolute values. The timing circuit advances, retains, or retards its sampling interval depending on whether the difference is positive, zero, or negative, respectively. In one embodiment, these timing adjustments are made in proportion to the amount of the calculated difference.

A different embodiment of the present invention comprises a data storage medium tangibly embodying a program of instructions to encode a binary bit stream of user data, store the encoded sequence on a data storage medium, and to subsequently readback the stored sequence using an improved timing recovery scheme.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Broadly, the present invention involves the timing (also referred to herein as "timing recovery") for readback of information stored on magnetic recording media such as tape or disk media. The invention encodes a stream of binary user data into an encoded sequence, containing a predetermined binary pattern with a guaranteed minimum frequency, which allows precise self-clocking during subsequent readback operations. The invention also concerns a system for reading flux transitions stored on the recording medium to generate a continuous analog readback waveform and for timing this waveform.

HARDWARE COMPONENTS AND INTERCONNECTIONS

Data Storage Circuitry

Figure 1:
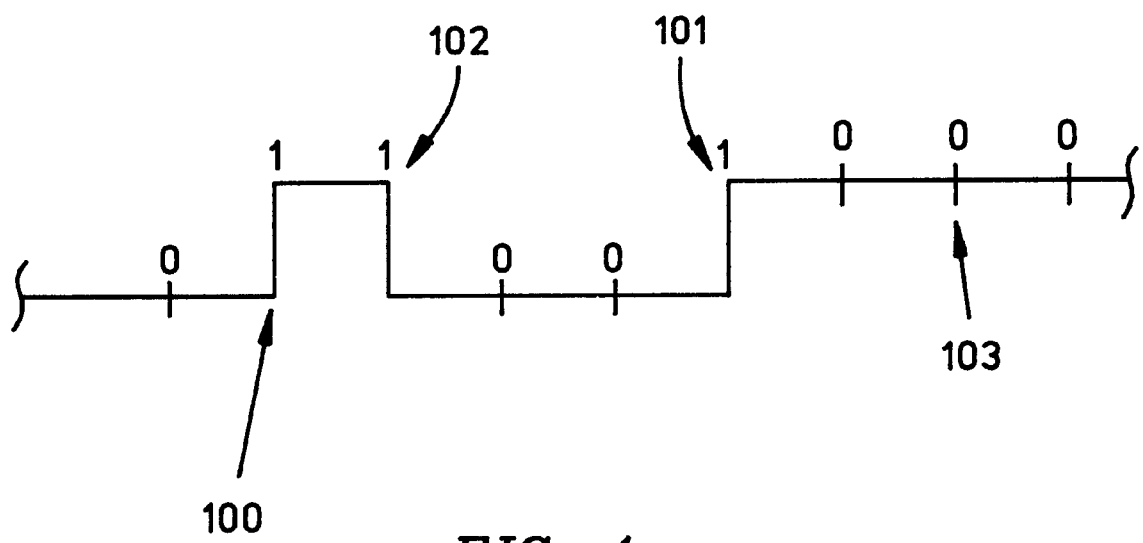
FIG. 1 is a diagram illustrating a sequence of stored flux transitions.
Figure 2:
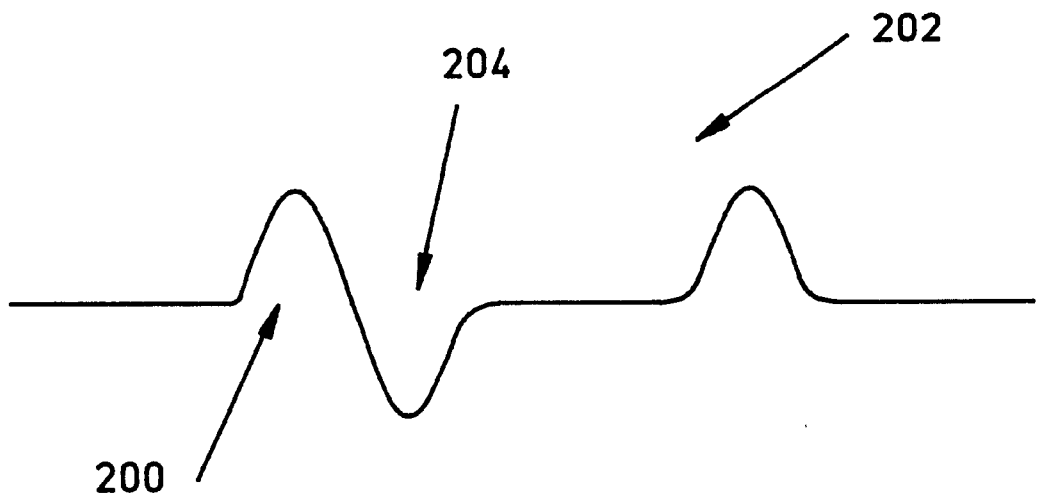
FIG. 2 is a diagram illustrating an analog readback waveform created by reading stored flux transitions.
Figure 3:
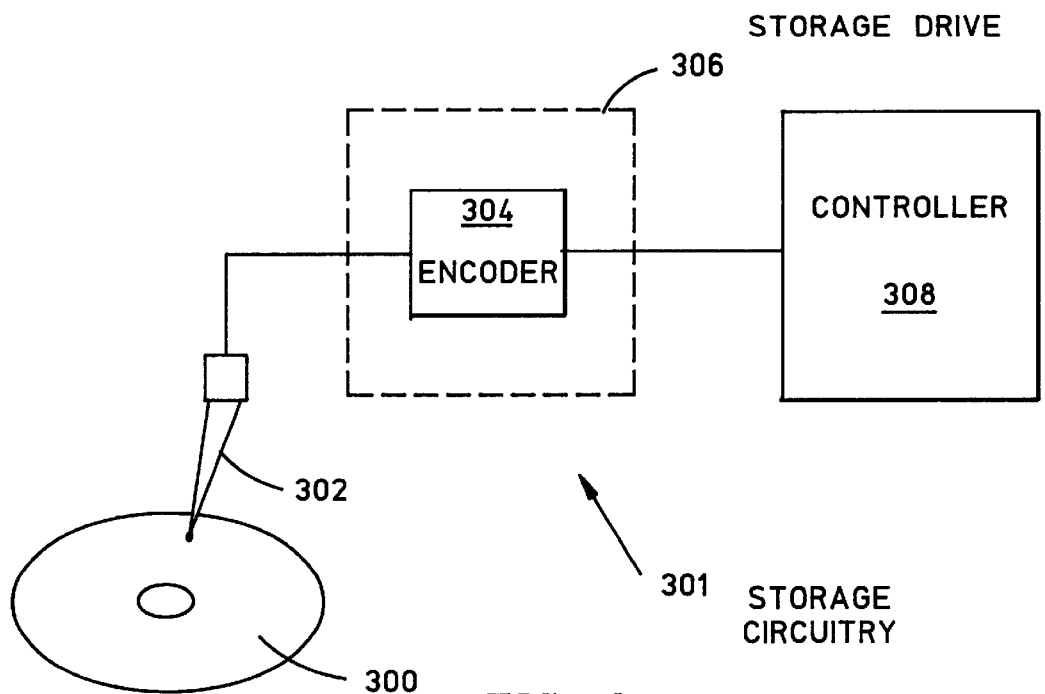
FIG. 3 is a diagram illustrating the hardware components and electrical connections of storage circuitry of the invention.

Broadly, the apparatus aspect of the invention concerns circuitry for reading and writing signals to a magnetic recording medium. FIG. 3 illustrates storage circuitry 301 for writing signals to a recording medium 300. In particular, a write head 302 writes a binary bit stream, in the form of flux transitions, to the medium 300. The write head 302 is electrically connected to an encoder 304, which represents one component (others not shown) of a storage drive 306 such as a "hard disk." The storage drive 306 is electrically connected to a controller 308.

In operation, the controller 308 receives or generates a sequence of uncoded binary user data to be stored on the medium 300. The controller 308 provides the uncoded bit stream to the drive 306, and the encoder 304 encodes the uncoded bit stream for storage on the medium 300. As discussed in greater detail below, this encoding enables the readback of the stored signals to be precisely timed.

Data Readback Circuitry

Figure 4:
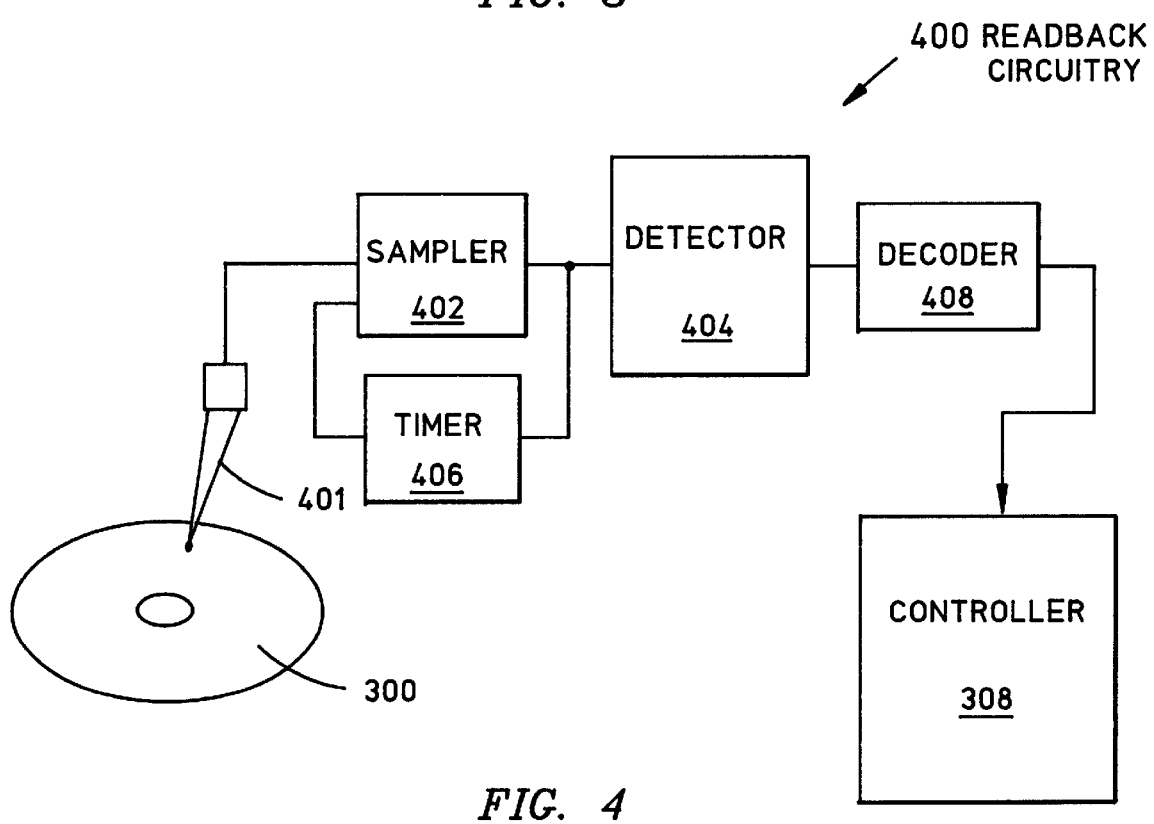
FIG. 4 is a diagram illustrating the hardware components and electrical connections of readback circuitry of the invention.

In addition to the storage circuitry 301 exemplified by FIG. 3, the invention also contemplates readback circuitry 400 such as that depicted by FIG. 4. FIG. 4 illustrates the circuitry to readback signals stored on the recording medium 300.

More specifically, a read head 401 generates a continuous analog readback waveform by sensing flux transitions stored on the medium 300. The read head 401 is connected to a sampler 402 which samples the readback waveform produced by the read head 401 and provides a representative stream of digitized signals. The sampler 402 is electrically connected to a detector 404, which estimates the original encoded binary bit stream in response to the sampler's output, as discussed in greater detail below.

The detector 404 is further connected to a decoder 408, which decodes the encoded binary bit stream provided by the detector 404, by reversing the process originally used to encode the uncoded binary stream of user data. The decoder 408 therefore performs the final step in reconstructing the binary user data originally received for storage on the recording medium. The decoder 408 provides its output to the controller 308 or another system. The sampler 402 is also connected to a timing circuit 406, which evaluates the sampler's digitized stream to determine whether any adjustment is needed in the timing of samples taken by the sampler 402.

OPERATION

Introduction

In addition to the hardware components and interconnections described above, the present invention contemplates various methods for information storage and readback. One aspect of the invention concerns a method where a sequence of binary user data is encoded into a sequence with a specific binary pattern to permit subsequent timing recovery with improved accuracy during readback operations. A different aspect of the invention involves a method for timing recovery during readback operations, employing features in an analog readback waveform corresponding to those binary patterns.

Figure 5:
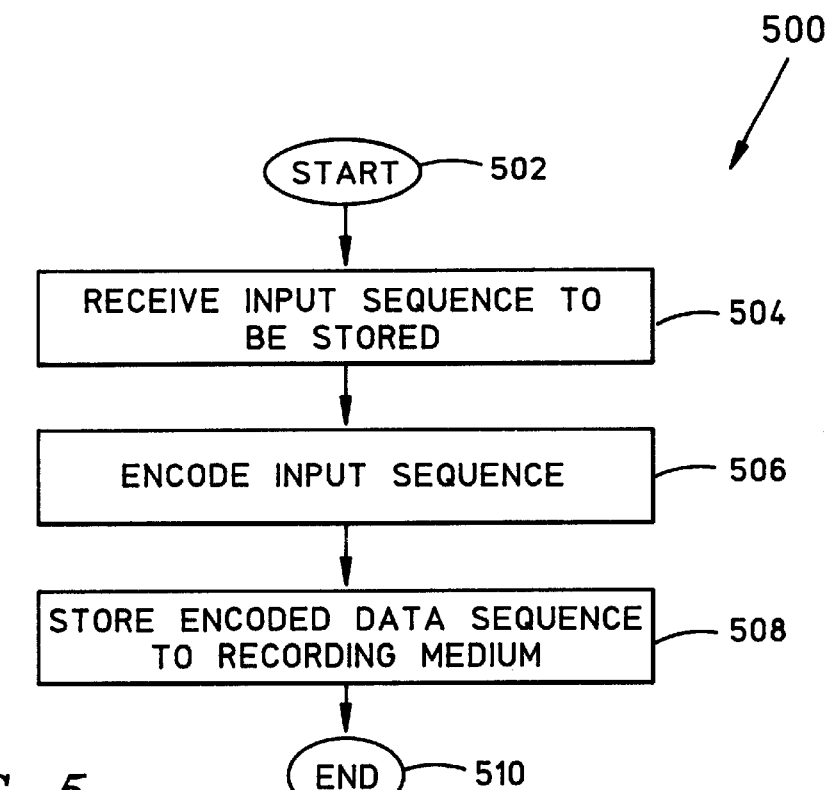
FIG. 5 is a flowchart illustrating an exemplary data storage routine of the invention.

FIG. 5 depicts an exemplary routine 500 to carry out the data storage method of the invention. As an example, the routine 500 may be carried out using the hardware components of FIGS. 3–4. After the routine 500 begins in task 502, the storage drive 306 receives a sequence of binary user data for storage on the medium 300. The drive 306 may receive the sequence of binary user dates from the controller 308, for example.

Encoding

Next, in task 506, the encoder 304 encodes the sequence of binary user data in preparation for storage on the medium 300. Specifically, the encoder 304 encodes each word of the binary data sequence using an "m/n rate block coded sequence." Under this code, "m" represents the number of bits in a "group" of uncoded binary user bits to be encoded, and "n" represents the number of bits in the corresponding "group" of encoded bits. Each group of "n" encoded bits contains at least one binary pattern that enables accurate timing of subsequent readback operations, as discussed below.

The binary pattern, when stored as flux transitions and subsequently read back to form an analog readback waveform, provides a "peak" or "zero-crossing." The binary pattern is preferably "010" (corresponding to an analog peak) or "101" (corresponding to an analog zero-crossing). It may also be a more lengthy sequence, such as "00100" and "11011", respectively, although this reduces the data storage efficiency.

Addressing task 506 more specifically, the encoder 304 encodes the binary user sequence received from the controller 308 such that the binary pattern appears frequently. For the purpose of encoding, uncoded and coded binary sequences are discussed in terms of "groups" of bits. Thus, in the preferred embodiment where the encoding scheme describes an 8/9 rate block coded sequence, a "group" of uncoded bits includes 8 bits and a "group" of encoded bits includes 9 bits. More specifically, a "group" of uncoded binary user data occupies 8 bits, encompassing all possible input combinations from "00000000" to "11111111". Each "group" of encoded bits occupies 9 bits, and contains at least one specific binary pattern.

Figure 7:
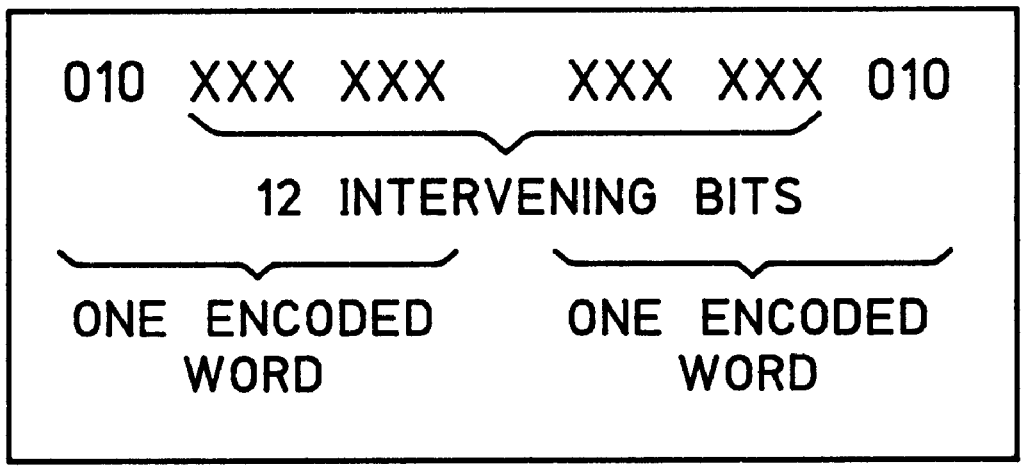
FIGS. 7–8 are diagrams illustrating the maximum separation between consecutive peaks embodied by "010" patterns.
Figure 8:
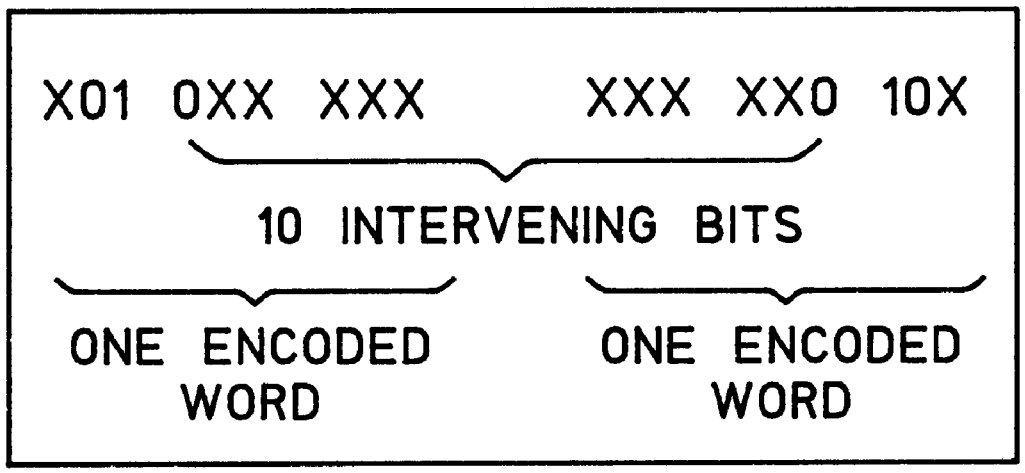

With this encoding scheme, the binary patterns (e.g., "010") from two neighboring encoded groups cannot be separated by more than 12 intervening bits, as shown by FIG. 7. Preferably, however, an improved version of this scheme is implemented, which refrains from placing "010" only in the first or last bits of an encoded group. In other words, this approach does not use the words "010xxxxxx" or "xxxxxx010", where "x" represents a sequence of intervening zeros and/or ones not containing the pattern "010". Therefore, as shown in FIG. 8, "010" patterns in two neighboring encoded groups can never be separated by more than 10 intervening bits. Accordingly, the "010" pattern occurs in the encoded bit stream with at least a "guaranteed minimum" level of frequency. Moreover, this degree of frequency may be selectively increased or decreased by redefining the minimum number of intervening bits, and/or redefining the length of the encoded bit groups.

This encoding scheme exhibits "perfect mapping", because there are 256 possible input groups (i.e., 00000000 to 11111111 inclusive), and 256 possible output groups (i.e., all nine bit sequences containing at least one "010" pattern where the combinations 010xxxxxx and xxxxxx001 are excluded, and "010" does not appear in xxxxxx.)

Figure 9:
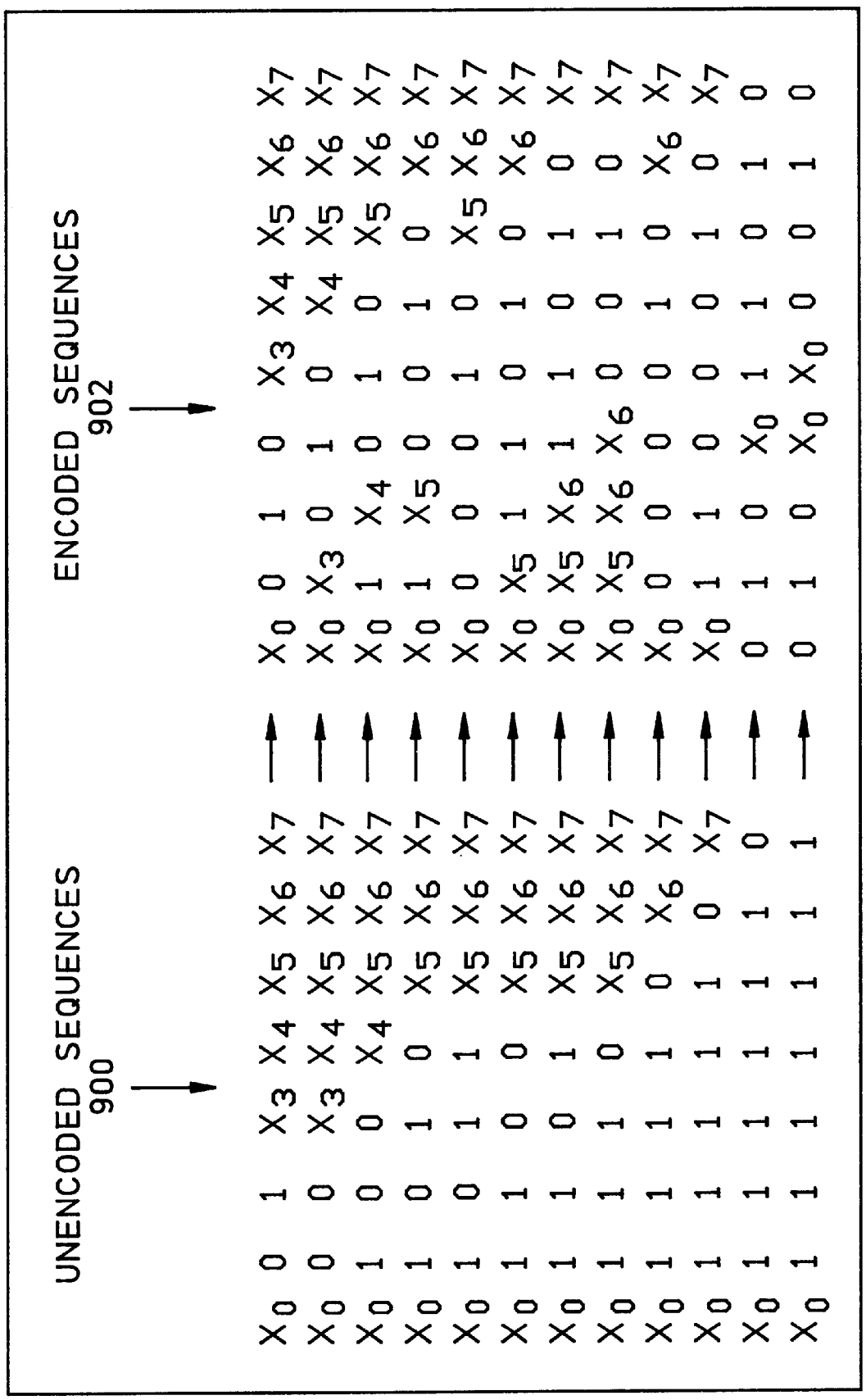
FIG. 9 is an exemplary encoding table pursuant to the invention.

FIG. 9 illustrates an example of an encoding table to implement the 8/9 rate block coded sequence described above. Each subscripted "X" character refers to the value of a bit of the uncoded group, where the subscript identifies the bit's position in the group. For example, $X_0$ identifies the binary "zero" or "one" located at the first bit position of the uncoded group. In FIG. 9, all possible uncoded groups appear in a column 900, and the corresponding output encoded groups appear in like rows of a column 902.

Storage

After task 506 individually encodes groups of uncoded binary user data as shown above, task 508 stores the encoded sequence on the recording medium 300. More particularly, the write head 302 stores binary flux transitions corresponding to the encoded binary bit sequence to the recording medium 300. Task 508 may be performed, for example, using known techniques for magnetically storing binary data. After task 508, the steps of encoding and storing the data are complete, and the routine 500 ends in task 510.

Readback

Figure 6:
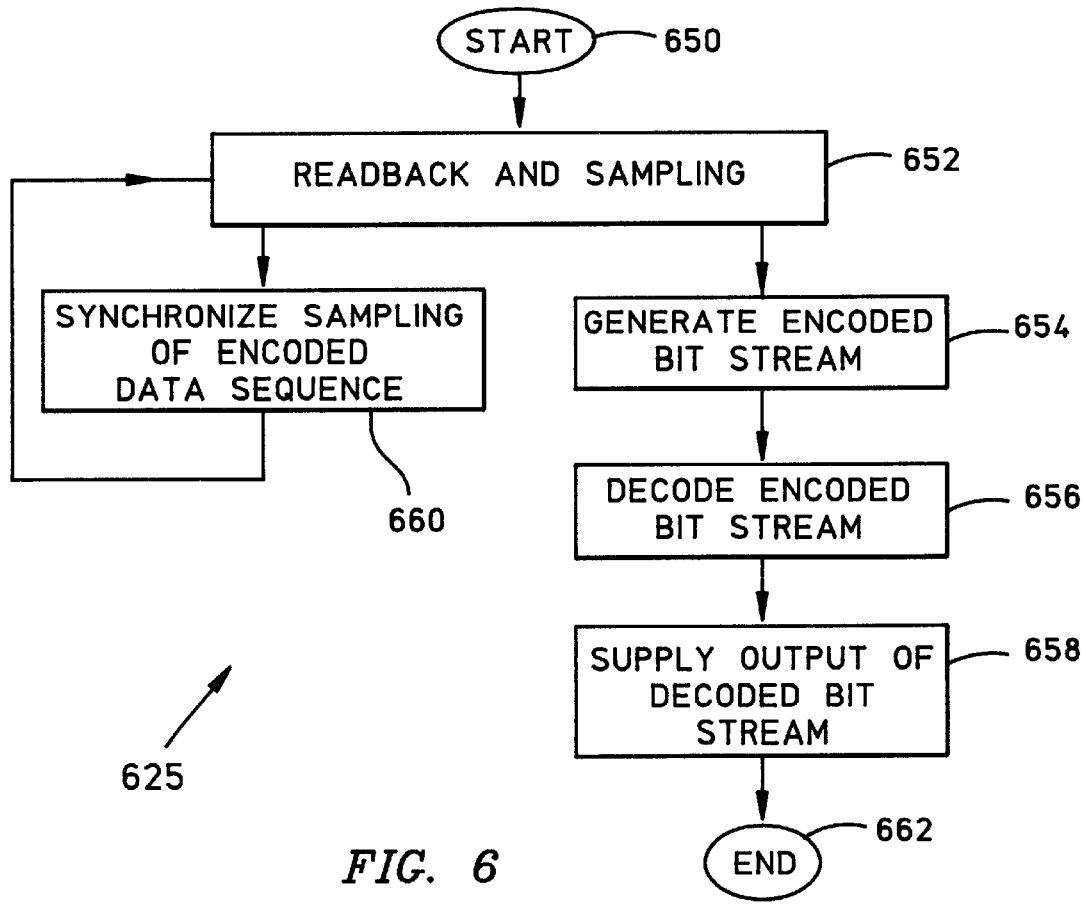
FIG. 6 is a flowchart illustrating an exemplary data retrieval routine of the invention.

FIG. 6 depicts a sequence of steps 625 that illustrate an exemplary data readback method of the invention. The steps 625 may be carried out, for example, by the hardware components of FIGS. 3–4. After the routine 625 begins in task 650, task 652 begins to read back encoded data stored on the recording medium 300. Specifically, the read head 401 senses the flux transitions stored on the medium 300, and generates a continuous analog readback waveform, representative thereof. The sampler 402 samples the analog readback waveform at times specified by the timing circuit 406 in task 660. As discussed above, the sampler 402 provides a digitized stream representing of the samples of the analog readback 20 waveform.

Figure 10:
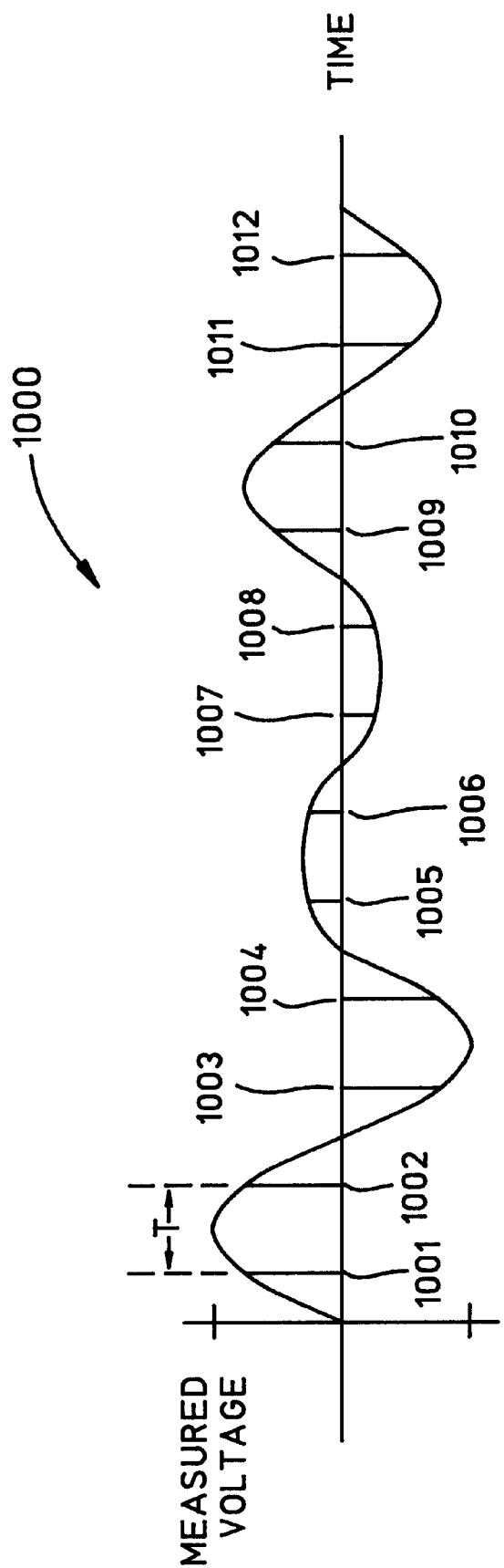
FIG. 10 is a diagram of the analog readback waveform created by the read head while reading flux transitions from a recording medium.

The example of FIG. 10 illustrates the operation of the sampler 402 in greater detail. The read head 401 first creates an electrical voltage (i.e., the analog readback waveform) corresponding to the flux transitions stored on the medium 300, as shown by the waveform 1000. In one embodiment, the analog readback waveform may comprise a voltage signal. The sampler 402 periodically samples the readback waveform 1000 in accordance with a periodic clock signal provided by the timing circuit 406. The clock signal may exhibit a fixed period "T", as discussed in greater detail below. At each prescribed sampling time 1001–1012, the sampler 402 provides a digital signal proportional to the sample taken at that time.

Processing

After task 652, task 654 processes the sampler's digitized sequence to reconstruct the encoded bit stream, which was originally generated by the encoder 304 and stored on the medium 300. Specifically, the sampler 402 provides its output of digitized samples to the detector 404, which translates the sampled digitized sequence into a stream of encoded binary bits. More particularly, the detector 404 applies a processing routine to the digitized samples to identify analog pulses occurring in the readback waveform, and thereby reconstruct the encoded binary sequence that was previously stored on the medium. This processing routine considers inter symbol interference and other effects to map the digitized stream to a corresponding sequence of encoded binary bits. If desired, the processing routine may employ one or more routines that are already known by ordinarily skilled artisans.

Figure 11:
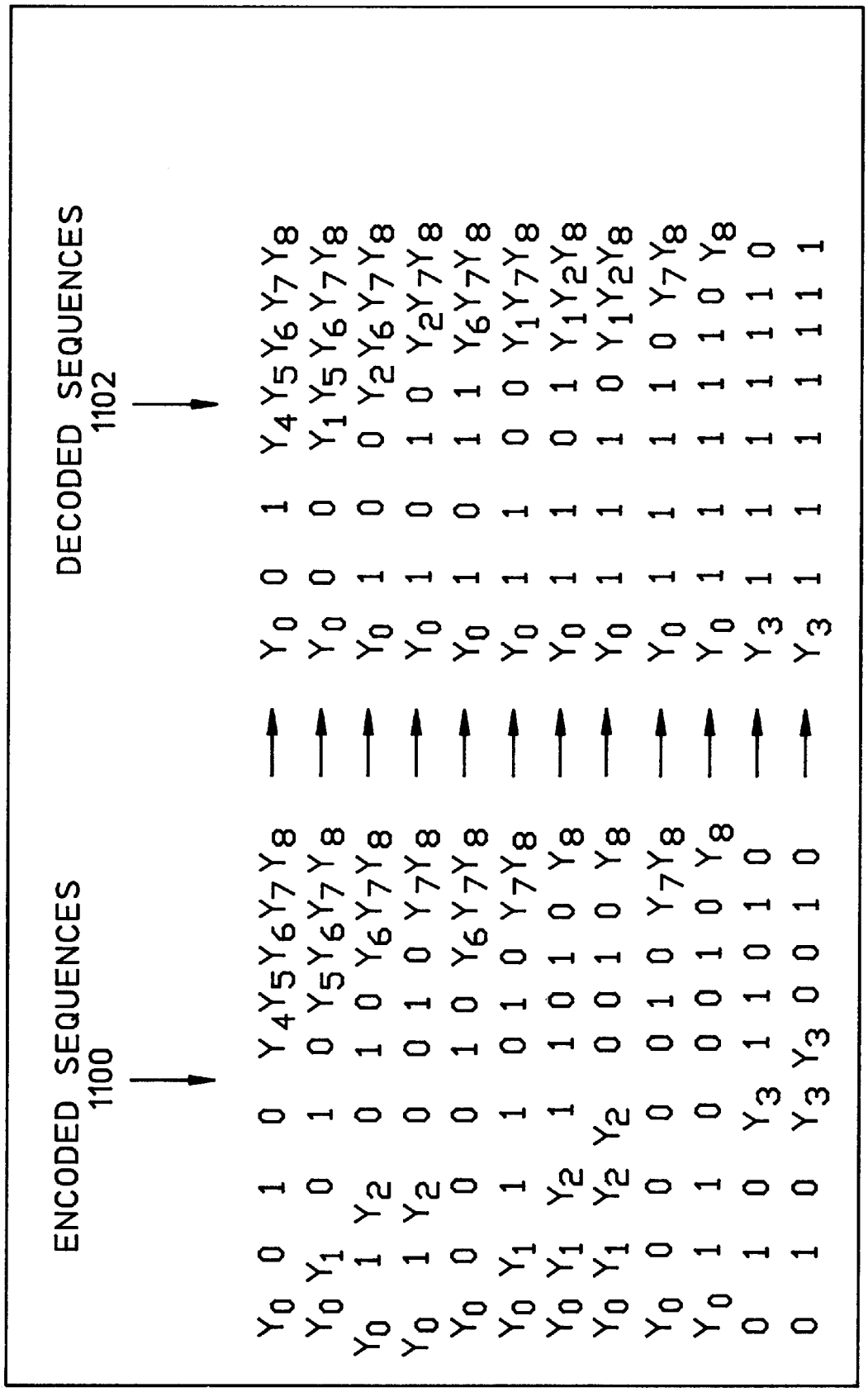
FIG. 11 is an exemplary decoding table pursuant to the invention.

In task 656, the decoder 406 decodes the encoded bit stream produced by the detector 404. Namely, the decoder 406 reverses the translation of FIG. 9 to effectively decode each encoded group of bits back into an uncoded 8-bit group. FIG. 11 illustrates an example of a decoding table to implement a decoding function corresponding to the 8/9 rate block coded sequence described above. Each subscripted "Y" character refers to the value of a bit of the encoded group where the subscript identifies the bit's position in the group. For example, $Y_0$ identifies the binary "0" or "1" located in the first bit position of the encoded group received from the detector 404. In FIG. 11, all possible encoded groups appear in a column 1100, and the corresponding decoded groups of appear in like rows of a column 1102. To identify and distinguish each 9-bit group of the encoded binary stream, the decoder 406 may apply known methods for byte synchronization, which may be applied by one skilled in the art and having the benefit of this disclosure.

Output

In task 658, the decoder 406 provides an output of the decoded bit stream to the controller 308, or another desired destination, and the routine 625 ends in task 662.

Timing Recovery

As mentioned above, the timing circuit 406 in task 660 adjusts the timing of the samples 1001–1012. This ensures that the read head's analog readback waveform 1000 is sampled at the appropriate times to most accurately interpret the pulses therein. This timing adjustment represents an important function of the invention.

As mentioned above, the sampler 402 provides an output comprising a sequence of digits, such as integers, each representing a "snapshot" sample of the analog readback waveform developed by the read head 401. The timing circuit 406 uses the sampler's past output to select the times at which the sampler 402 samples future output of the read head 401 (e.g., "010").

The present invention uses the specific binary bit patterns (e.g., "010") to create well defined analog timing "peaks" having the maximum possible positive or negative amplitude. Alternatively, the invention may use specific binary bit patterns (e.g., "101") to create well defined analog zero-crossings. For ease of illustration, the following description is made in the context of analog peaks created using the binary bit pattern "010". Unless the samples of the continuous analog readback waveforms are evaluated properly, the analog "peaks" can be difficult to identify. To overcome this difficulty, the readback circuitry 400 of the present invention advantageously compares two consecutive samples of the analog readback waveform, and compares the samples to determine whether they correspond to a peak or not. If the samples correspond to a peak, the circuitry 400 determines whether any adjustment in sampling timing is needed, and implements the adjustment accordingly.

Figure 12:
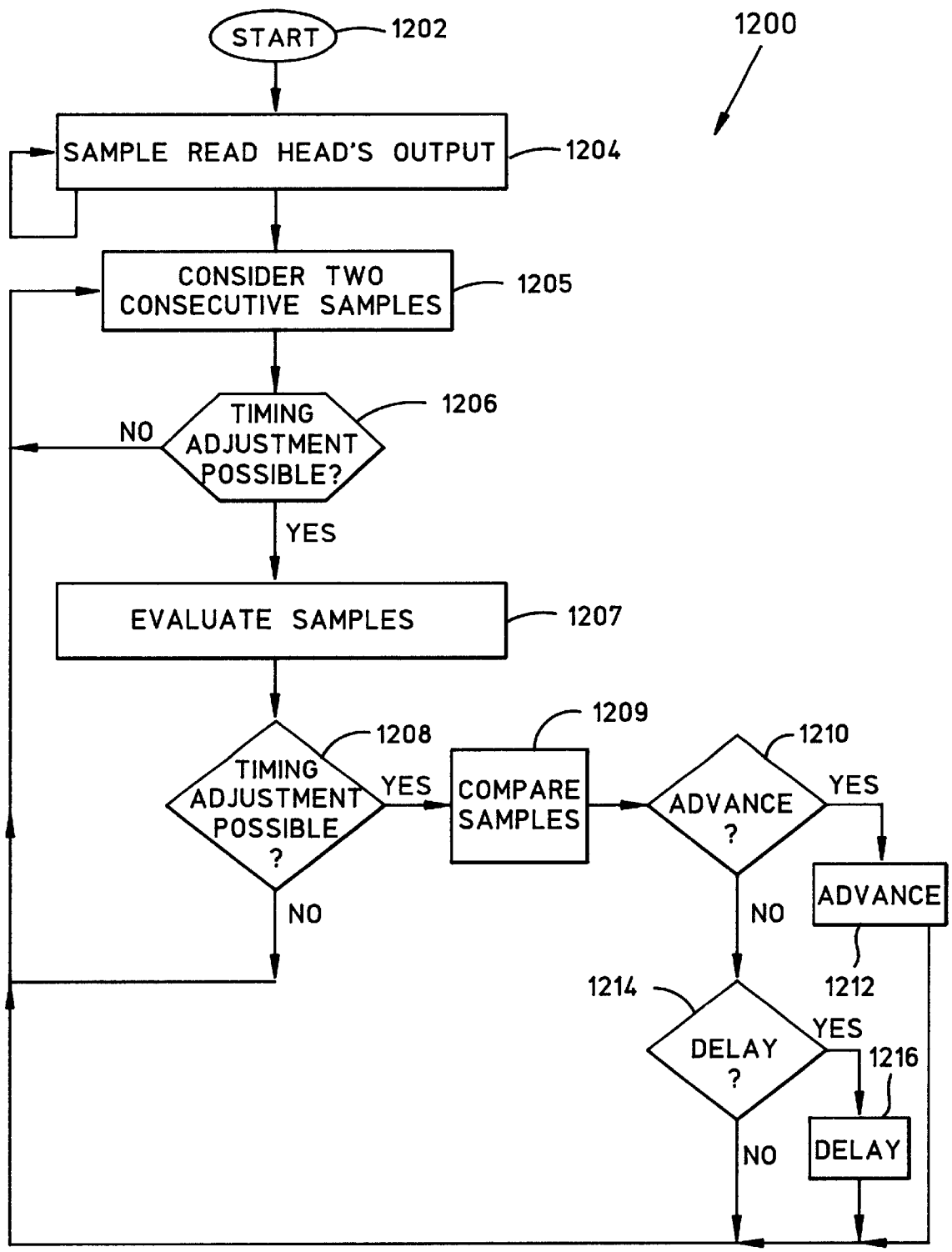
FIG. 12 is a flowchart illustrating an exemplary readback and timing routine of the invention.

The operation of the invention in this respect is more easily understood with reference to the exemplary timing routine 1200 (FIG. 12). In the preferred embodiment, the timing circuit 406 and sampler 402 continuously perform the routine 1200, to ensure that the sampler 402 receives electrical signals from the read head 401 at the proper times. In task 1204, the sampler 402 continually samples the analog readback waveform produced by the read head 401. Sampling is preferably conducted in accordance with the well known PR4 protocol or another scheme in which samples are taken at a periodic interval. If this interval is designated as "T", then the period of between the reading of successive flux transitions by the read head 401 equals 2T.

Task 1205 considers two consecutive samples to determine whether the samples are useful in identifying and correcting any timing errors between the operation of the sampler 402 and the continuous analog readback waveform. In the case where timing "peaks" are used (e.g., corresponding to "010" bit patterns), the two consecutive samples are not useful in evaluating and correcting timing unless the samples have like mathematical signs. Therefore, if one sample has a positive sign and the other sample has a negative sign, the two samples cannot possibly correspond to a peak; in this case, query 1206 returns control to task 1205 to consider the next two consecutive samples. However, if query 1206 determines that both samples have the same mathematical sign, these samples are potentially useful in identifying and correcting timing errors: accordingly. control advances to task 1207.

Generally, task 1207 further analyzes the two consecutive samples to determine whether the samples are useful in identifying and correcting timing. The evaluation of task 1207 may be made using a calculation such as Equation 1, below.

$$\text{EVAL}_{xy} = |X| + |Y| \qquad [1]$$

where:
X=the amplitude of the first sample;
Y=the amplitude of the second sample; and
EVAL$_{xy}$=the sum of the absolute value of X and the absolute value of Y.

Based on this evaluation, the timing circuit 406 in query 1208 determines whether any timing adjustment can be made based upon the two samples. Particularly, timing correction is possible only if EVAL$_{xy}$ exceeds a predetermined threshold. By requiring samples of sufficient additive magnitude, the threshold helps ensure that the samples indicate a timing "peak". In other words, the evaluation of tasks 1207–1208 identifies all samples that are associated with the binary patterns ensured by the encoding process.

If EVAL$_{xy}$ falls below the threshold, control returns to task 1205 and no timing adjustment is made. If EVAL$_{xy}$ exceeds the threshold. however, the samplers are deemed to be useful in identifying any timing adjustments that are required. Specifically, if EVAL$_{xy}$ exceeds the threshold, task 1209 compares the samples, and queries 1210 and 1214 determine whether timing should be advanced, retarded, or retained. As an example, task 1209 may compare the sample pair according to Equation 2, below.

$$\text{COMPARE}_{xy} = |X| - |Y| \qquad [2]$$

where:
X=the amplitude of the first sample;
Y=the amplitude of the second sample; and
COMPARE$_{xy}$=the difference of the absolute value of X and the absolute value of Y.

After task 1209, query 1210 asks whether the comparison of task 1209 mandates advancement of the timing, i.e. taking samples earlier. In the illustrated embodiment, query 1210 is performed by asking whether COMPARE$_{xy}$ is greater than zero. If so, timing is advanced in task 1212. If query 1210 answer in the negative, query 1214 asks whether timing should be delayed, i.e. samples should be taken earlier. In the illustrated embodiment, timing should be advanced, (i.e., samples should be taken later) if COMPARE$_{xy}$ is negative. If so, timing is delayed in task 1216. If queries 1210 and 1214 both answer in the negative, no timing adjustment is made.

As discussed above, the timing circuit performs tasks 1212 and 1216 to initiate sampling at earlier or later times, as appropriate. The magnitude of the timing change may, for example, be implemented in proportion to the magnitude of COMPARE$_{xy}$. Alternatively, the timing may be adjusted by a fixed increment of time each time task 1209 yields a non-zero value of COMPARE.

Figure 13:
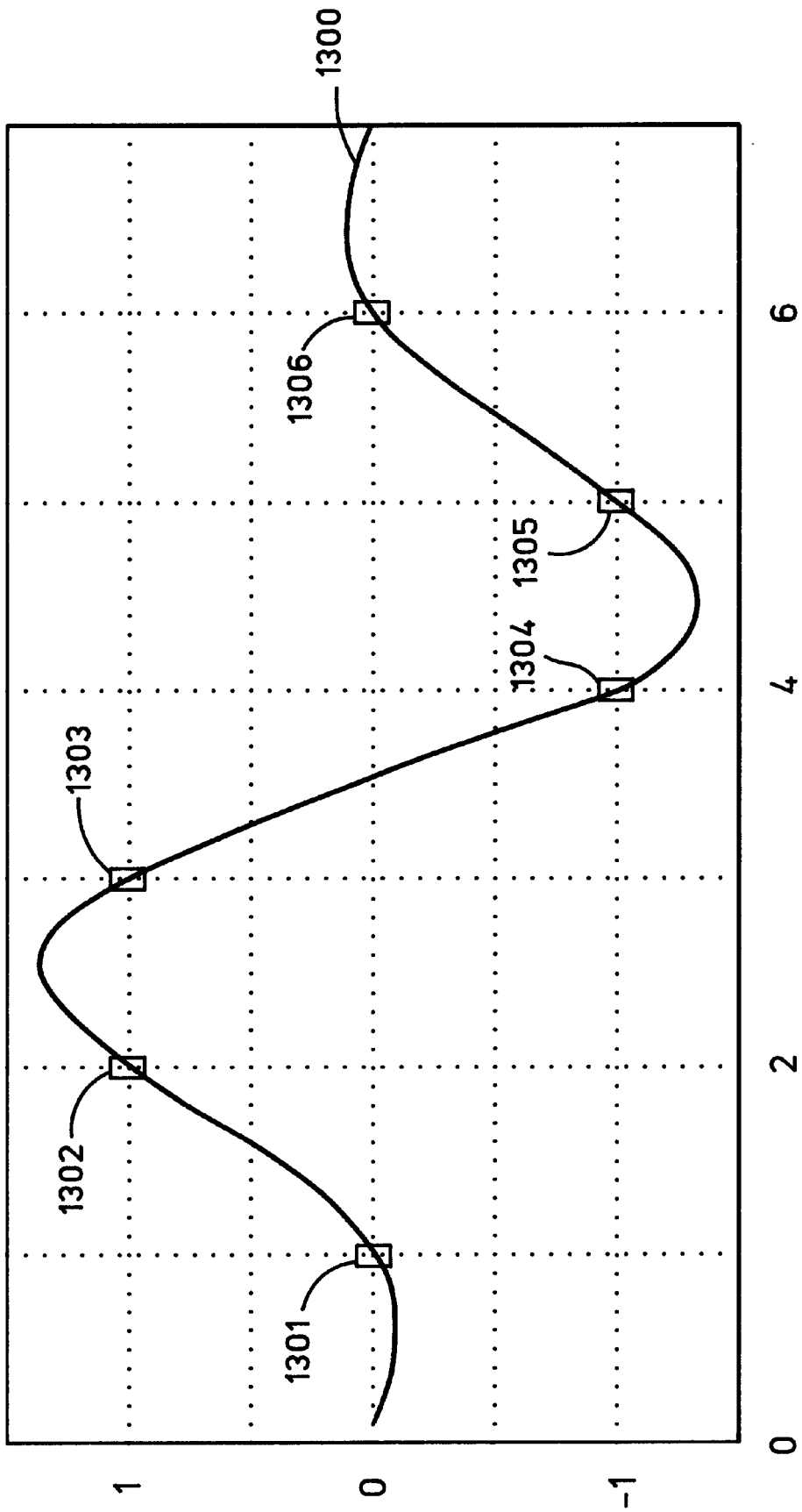
FIG. 13 is a diagram illustrating an analog readback waveform created by the read head while sensing flux transitions stored on a data storage medium, illustrating optimal timing for sampling.

After 1212, task 1216, of a negative answer to query 1214, control returns to task 1205 to evaluate the next two consecutive samples. With the timing scheme described above, the timing circuit 406 adjusts the timing of the sampler 402 to maintain optimum sampling. Particularly, in the case of an illustrative readback waveform 1300, the timing circuit 406 maintains the samples 1310–1315 (FIG. 13). Namely, the comparison of each sample pair is employed in such a manner that timing is later advanced (task 1212) or delayed (task 1216) until the samples occur as shown in FIG. 13. Specifically, the samples occur between the maximum amplitude and zero-crossing of the analog readback waveform. More particularly, the samples occur at T/2 seconds before each maximum amplitude pulse and T/2 seconds thereafter. As mentioned above, this timing scheme is referred to as "peak detection" timing.

READBACK EXAMPLE

The preceding discussion of FIG. 12 may be further illuminated by considering the processing of an exemplary analog readback waveform 1400 (FIG. 14) in accordance with the tasks 1200. In task 1204, d sampler 402 periodically samples the analog readback waveform from the read head 401, yielding samples 1401–1406. The timer 406 in task 1205 then considers the two consecutive samples, such as 1402–1403 in the present example. Specifically, task 1205 considers the sign of the two samples 1402–1403. Since the samples 1402–1403 both have positive signs, query 1206 concludes that timing adjustment is possible based upon these samples 1402–1403. In particular, the samples 1402–1403 are not precluded from indicating a "peak". Accordingly, control advances to task 1207 to determine whether other factors preclude the sample from being useful in timing adjustment.

Figure 14:
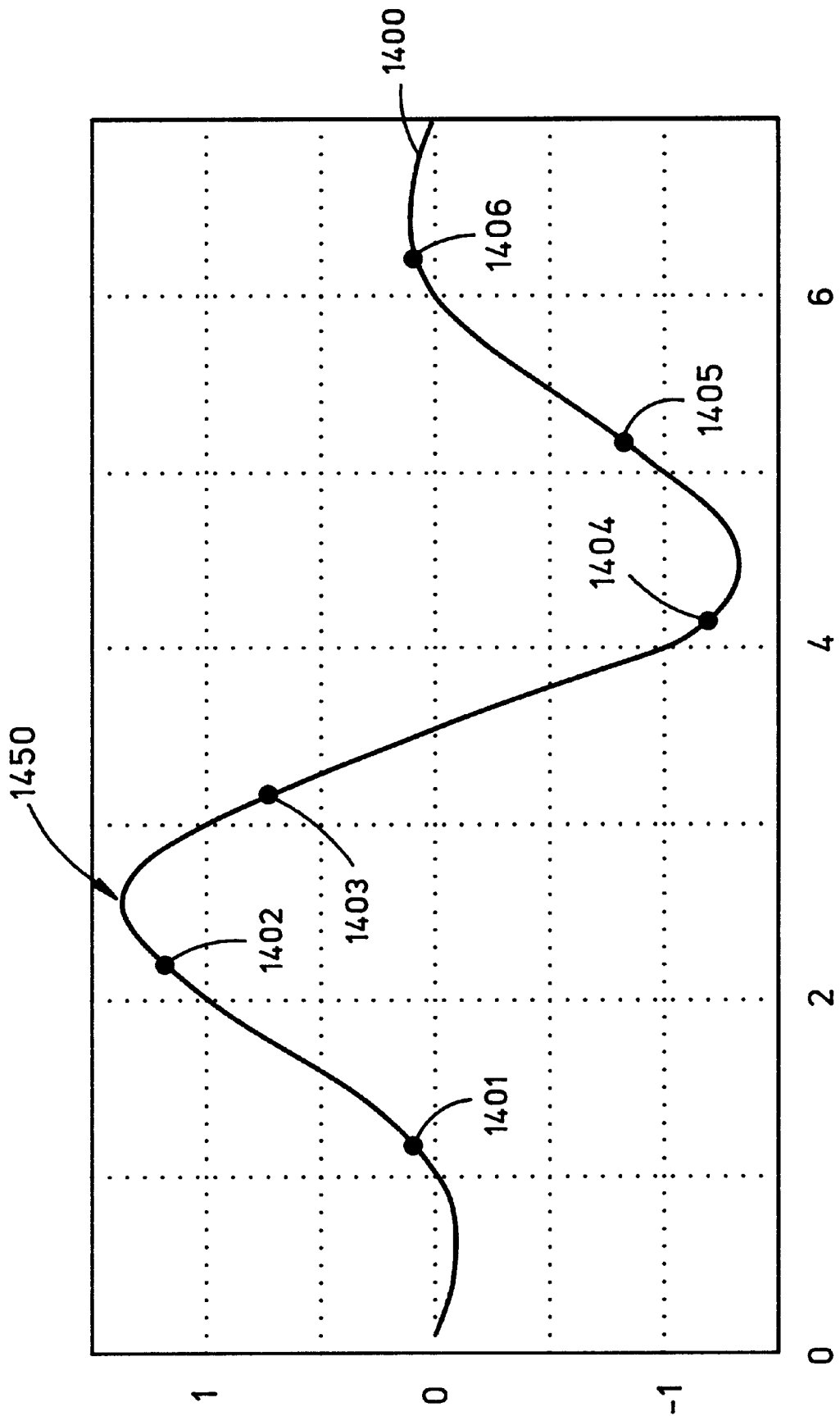
FIG. 14 is a diagram of an illustrative analog readback waveform where timing is delayed, to illustrate the operation of the invention.

Task 1207 evaluates the samples 1402–1403 using Equation 1, set forth above. Then, query 1208 determines whether timing adjustment is possible based upon the samples 1402–1403. In particular, query 1208 determines whether $EVAL_{xY}$ exceeds a predetermined threshold. In the example of FIG. 14, the analog readback waveform 1400 has a maximum possible amplitude 1404 of two units. Accordingly, the predetermined threshold may be set to approximately 2.0 units. In this example, $EVAL_{xY}$ is calculated to be approximately 2.1, because the first sample 1402 measures about 1.4 units and the second sample measures about 0.7 units. Therefore, since $EVAL_{xY}$ exceeds the threshold, the samples 1402–1403 may be useful in making any necessary adjustment in timing, so query 1208 advances to task 1209. Task 1209 compares the two consecutive samples 1402–1403 in accordance with Equation 2 (above). In the present example, a comparison of the samples 1402–1403 in task 1209 yields a $COMPARE_{xY}$ value of about 0.7 units. Accordingly, query 1210 recognizes that the value of $COMPARE_{xY}$ is greater than zero, and advances control to task 1212. In task 1212, timing is advanced, so that future samples are taken earlier. The amount of adjustment in the timing advancement of task 1212, as described above, may be proportionate to the magnitude of $COMPARE_{xY}$. After timing is advanced in task 1212, control returns to task 1205 to consider the next two consecutive samples 1404–1405.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

For example, the threshold may be changes to obtain a greater or lesser timing adjustment sensitivity.

Additionally, instead of basing timing adjustments upon "peaks" (as shown above), timing adjustment may be performed using zero-crossings. As mentioned above, zero-crossings are features in the analog readback waveform produced in response to binary bit patterns such as "101". When zero-crossings are used instead of peaks, the operation of tasks 1200 of FIG. 12 differ from that described above in a number of respects. First, query 1206 only concludes that timing adjustment is possible if the two consecutive samples have opposite signs. Another difference occurs in the operation of queries 1210 and 1214. Specifically, only if $COMPARE_{xY}$ is less than zero does query 1210 conclude that timing advancement is necessary. Analogously, query 1214 only requires that timing be retarded in the event that $COMPARE_{xY}$ is greater than zero.

What is claimed is:

1. A method for storing input groups of uncoded binary data on a magnetic recording medium to enhance timing recovery, each said group comprising a sequence of uncoded binary data, wherein the method comprises the steps of:

encoding each input group using an m/n rate block coded sequence and impressing a predetermined bit pattern thereon to provide corresponding output groups of encoded binary data; and storing the output groups on the magnetic recording medium.

2. The method of claim 1, wherein the predetermined bit pattern comprises 010.

3. The method of claim 1, wherein the predetermined bit pattern comprises 101.

4. The method of claim 1, wherein the m/n rate block coded sequence comprises an 8/9 rate block coded sequence.

5. A data storage apparatus for storing input groups of binary bits on a magnetic recording medium to enhance subsequent timing recovery, each of said input groups comprising an encoded binary sequence, said apparatus comprising:

an encoder to encode each input group using an m/n rate block coded sequence while impressing a predetermined bit pattern thereon to provide corresponding output groups of encoded binary bits; and a write head to store the output groups on the magnetic recording medium.

6. The apparatus of claim 5, wherein the predetermined bit pattern comprises 010.

7. The apparatus of claim 5, wherein the predetermined bit pattern comprises 101.

8. The apparatus of claim 5, wherein the m/n rate block coded sequence comprises an 8/9 rate block coded sequence.

* * * * *